United States Patent [19]

Hake

[11] 4,450,917
[45] May 29, 1984

[54] SELF-LEVELING ARRANGEMENT FOR AGRICULTURAL IMPLEMENT FRAME

[75] Inventor: Kenneth A. Hake, Tipton, Kans.

[73] Assignee: Kent Manufacturing Company, Inc., Tipton, Kans.

[21] Appl. No.: 408,014

[22] Filed: Aug. 13, 1982

[51] Int. Cl.³ ............................................. A01B 59/00
[52] U.S. Cl. ................... 172/328; 280/414.5
[58] Field of Search ............... 172/328, 327, 326, 413; 280/414.5

[56] References Cited

U.S. PATENT DOCUMENTS

| | | | |
|---|---|---|---|
| 2,717,479 | 9/1955 | Scheidenhelm | 172/328 |
| 2,970,656 | 2/1961 | Kampe | 172/328 X |
| 3,187,822 | 6/1965 | Clifford | 172/328 X |
| 3,207,233 | 9/1965 | Shumaker . | |
| 3,292,714 | 12/1966 | Tsuchiya et al. . | |
| 3,356,382 | 12/1967 | Fay . | |
| 3,583,495 | 6/1971 | Cantral . | |
| 3,658,362 | 4/1972 | Fackler et al. . | |
| 3,666,284 | 5/1972 | Hunter et al. . | |
| 3,759,332 | 9/1973 | Robertson, Sr. . | |
| 3,762,480 | 10/1973 | Hofer . | |
| 3,777,823 | 12/1973 | Holfeld | 172/328 |
| 3,912,017 | 10/1975 | Rehn . | |
| 3,912,018 | 10/1975 | Brundage . | |

Primary Examiner—Richard J. Johnson
Attorney, Agent, or Firm—Litman, Day & McMahon

[57] ABSTRACT

A leveling arrangement for an agricultural implement frame having a draft tongue which is pivotally attached to a front end of the frame includes a rocker arm attached to the frame front end for pivoting about a transverse axis, a transfer link pivotally connected between a lower end of the rocker arm and a frame lift lever extending from the frame lifting rockshaft, and a leveling link pivotally connected between an upper end of the rocker arm and a front end of the tongue. Rotation of the rockshaft by the action of a hydraulic cylinder to lift or lower the frame is transferred through the leveling arrangement, by reaction against the pivoted hitch member, to the front end of the frame to respectively lift or lower the frame front end to thereby maintain a substantially constant pitch of the implement frame.

3 Claims, 7 Drawing Figures

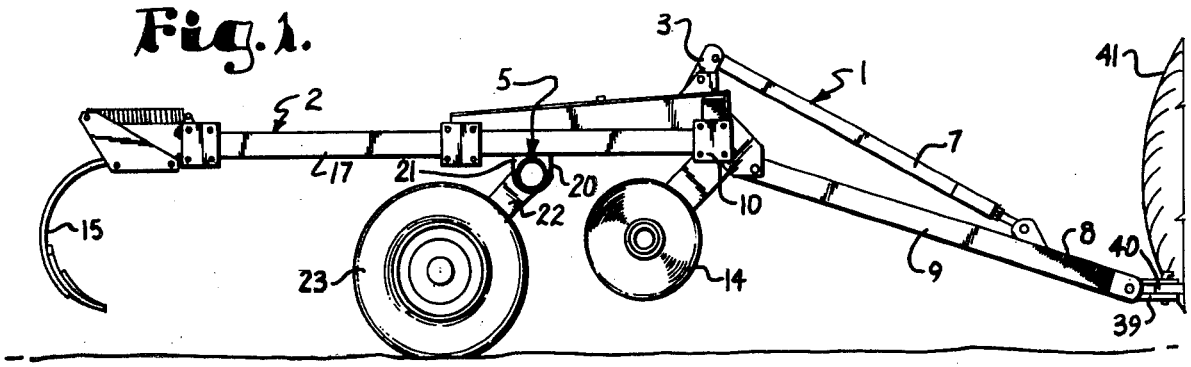
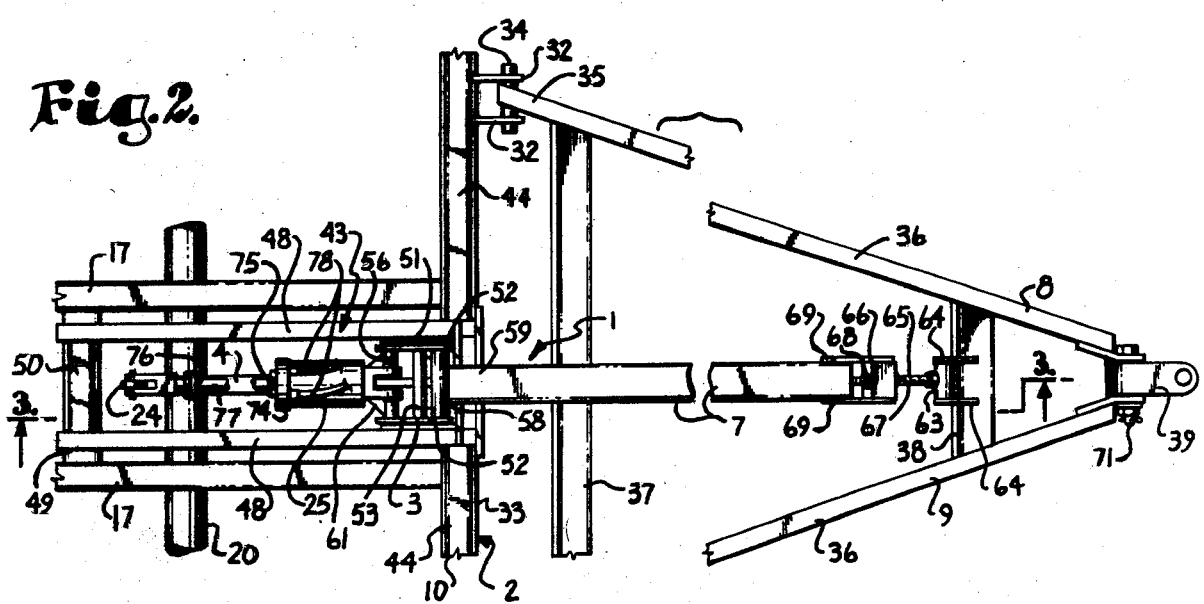
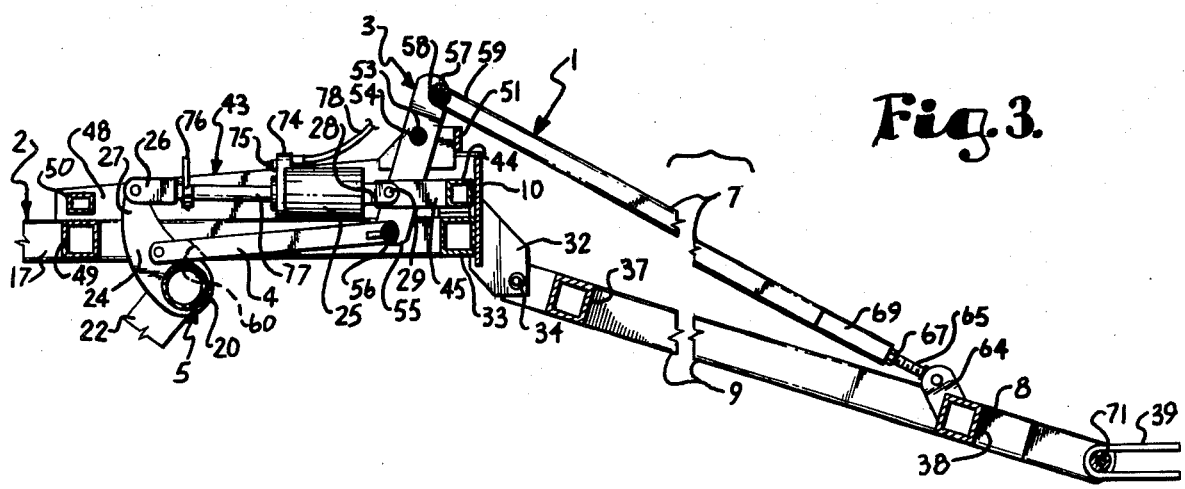

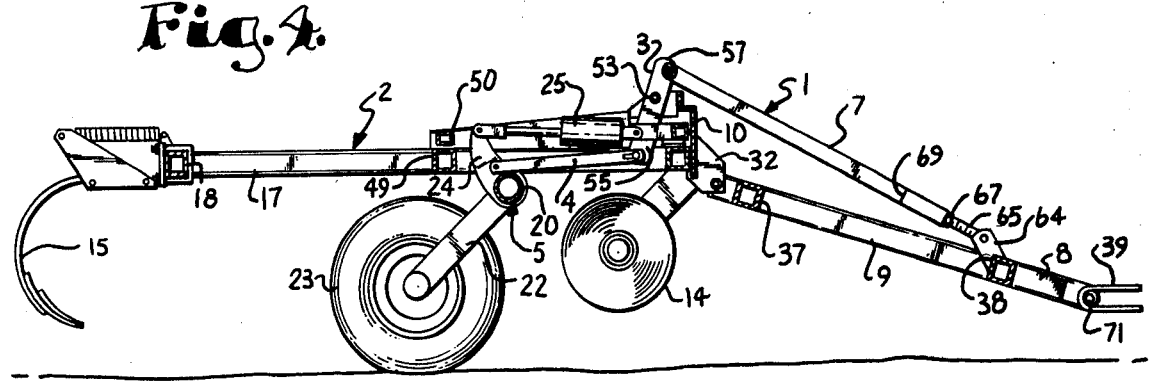
Fig.4.
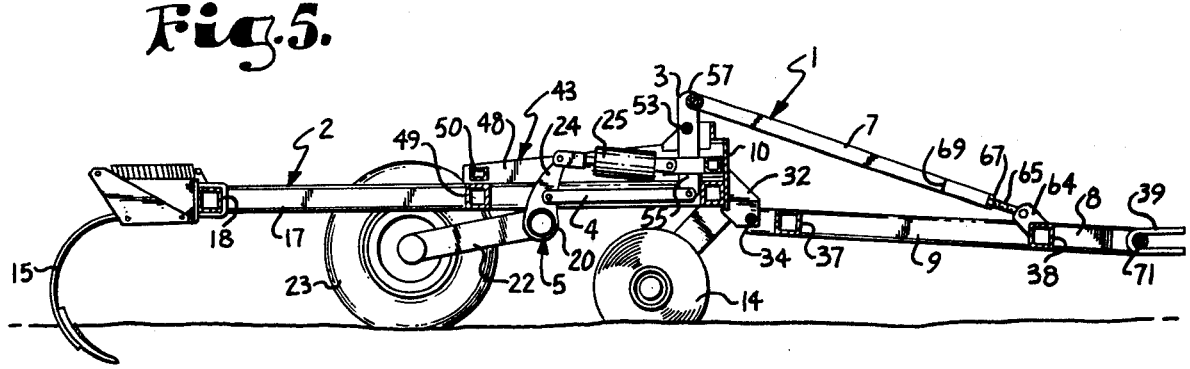
Fig.5.
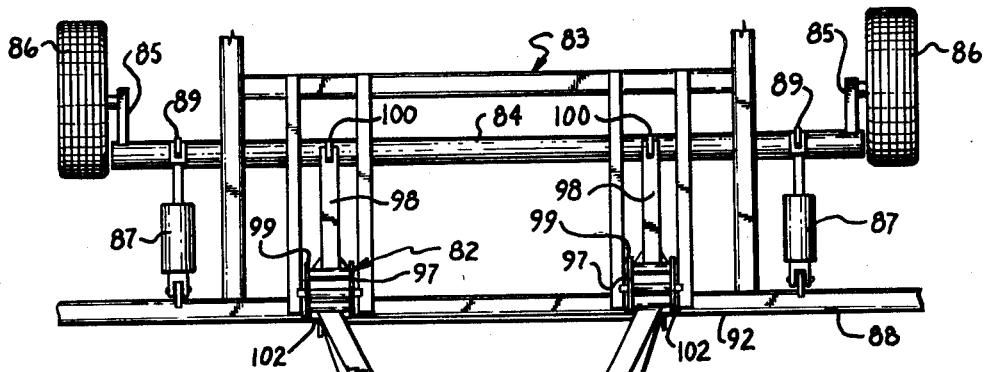
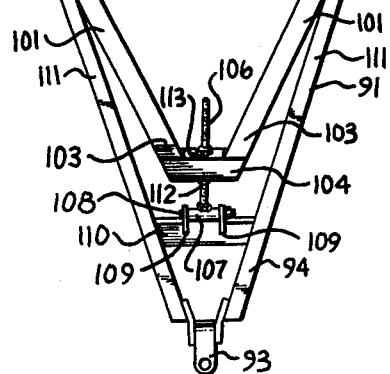
Fig.6.

SELF-LEVELING ARRANGEMENT FOR AGRICULTURAL IMPLEMENT FRAME

Field of the Invention

The present invention relates to agricultural implement frame arrangements and, more particularly, to a leveling mechanism for such a frame which has a pivotally attached draft tongue.

BACKGROUND OF THE INVENTION

In order to reduce fuel consumption and man-hours, agricultural implement frames are often equipped with several lateral rows of tillage tools at forward, median, and rear positions. When tillage tools are thus arrayed, it is necessary for the implement frame to be level in the soil working position of the frame to ensure uniform penetration of the tools from front to back and in the transport position to prevent undesired digging in of the tools when traveling over uneven ground.

In most of the known arrangements for leveling implement frames having pivoted tongues, resilient links or linkages are provided for the stated purpose at maintaining a desired force on tillage tools at a selected position on the frame. A problem with resilient leveling linkages is that when the frame is raised and transported, particularly over bumpy terrain, bouncing or rocking of the frame occurs which is transferred to the tractor, thereby making control of the tractor and frame difficult. In one known leveling arrangement, a single rigid link is connected between a lever arm on the rockshaft to a rearwardly extending portion of the tongue. While such an arrangement has the advantages of rigidity and simplicity, no provision is made for adjusting the pitch of the frame such that the frame would only be suitable for use with tractors having draw bars at a single height. Even if the link were adjustable, the position of the link on the frame would make adjustments difficult.

SUMMARY OF THE INVENTION

The present invention overcomes the disadvantages of the leveling arrangements employing resilient linkages by providing a leveling mechanism employing substantially rigid members. One of the link members is conveniently adjustable such that the frame employing the present leveling arrangement may be used with a wide variety of tractors.

OBJECTS OF THE INVENTION

The principal objects of the present invention are: to provide an improved agricultural implement frame including particularly a leveling arrangement therefor; to provide such an arrangement for leveling an implement frame having a pivoted draft tongue; to provide such an arrangement which maintains a level pitch of the implement frame substantially rigidly to thereby control the working depth and working angle of tillage tools at the front and rear of the frame; to provide such an arrangement having an adjustable link to allow use of the implement with tractors having different draw bar heights; to provide such an arrangement which maintains a level pitch of the frame throughout the range of heights of the frame above the ground; to provide such an arrangement which is interconnected with the frame lifting mechanism such that leveling is coordinated with the lifting and lowering of the frame; to provide such an arrangement employing substantially rigid links for greater stability in transport of the implement; to provide such an arrangement which maintains the frame at a level pitch with no extra effort on the part of an operator other than an initial adjustment; to provide such an arrangement which is adaptable to implement frames having foldable wing sections as well as single section frames; and to provide such a leveling arrangement for an agricultural implement frame which is economical to manufacture, positive and durable in operation, and which is particulary well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of an agricultural implement frame employing a leveling arrangement according to the present invention.

FIG. 2 is an enlarged fragmentary top plan view of the implement frame and leveling arrangement.

FIG. 3 is an enlarged fragmentary longitudinal sectional view taken on line 3—3 of FIG. 2 and illustrates details of the leveling arrangement.

FIG. 4 is a longitudinal view of the implement frame at a reduced scale and illustrates the positions of the components of the leveling arrangement in a tranport position of the frame.

FIG. 5 is a view similar to FIG. 4 and illustrates the positions of components of the leveling arrangement in a sol working position of the implement frame.

FIG. 6 is a fragmentary plan view of a modified embodiment of the leveling arrangement according to the present invention.

DETAILED DESCRIPTION OF THE PREFERRED EMBODIMENTS

Figure 7:
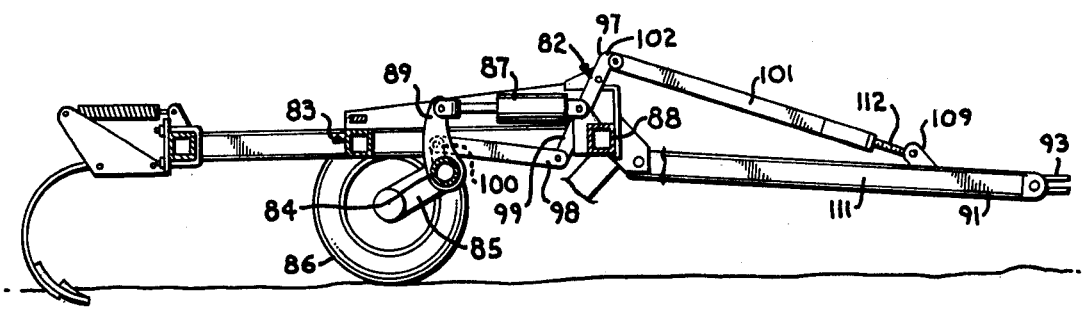
FIG. 7 is a fragmentary longitudinal sectional view of the modified embodiment of the leveling arrangement.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a leveling arrangement for an agricultural implement frame 2. Referring to FIG. 3, the leveling arrangement 1 generally includes a rocker arm assembly or rocker arm 3 pivotally mounted on the frame 2, a transfer link 4 pivotally connected between a frame lift assembly 5 and a lower end of the rocker arm 3, and a leveling link 7 pivotally connected between a front end 8 of the draft tongue 9 and a top end of the rocker arm. Upon operation of the frame lift assembly 5 to lift the frame 2 to a transport position (FIG. 4), the front end 10 of the frame is simultaneously lifted by the leveling arrangement 1. Similarly, upon lowering of the frame to a soil working position (FIG. 5), the front end 10 of the frame is lowered to thereby maintain a substantially constant pitch of the frame 2.

The frame 2 is a conventional implement frame suitable for supporting tillage tools during soil working. The illustrated frame 2 has discs 14 and spring teeth 15 mounted thereon respectively at forward and rear positions on the frame. The frame 2 is defined by a plurality of longitudinal beams 17 and transverse beams 18 rigidly joined together. The implement frame shown is a single section frame. However, the leveling arrangement is also adaptable to multiple section frames.

The frame lift assembly 5 includes a transverse rockshaft or torque tube 20 rotatably mounted on the frame 2 by means such as bearings 21. The rockshaft 20 hast at least two wheel arms 22 extending therefrom, and respective ground engaging wheels 23 are rotatably mounted thereon. The wheel arms 22 on the illustrated frame 2 extend in a downward and rearward direction of the frame. A lever arm 24 extends generally upwardly from the rockshaft 20. A hydraulic ram or cylinder 25 has a piston end 26 thereof pivotally connected to an outward end 27 of the arm 24, and the cylinder end 28 of the ram 25 is pivotally connected as at 29 to the frame 2. Upon extension of the cylinder 25, the wheel arms 22 are revolved downwardly, thereby raising the frame toward the transport position. Similarly, upon retraction of the cylinder 25, the frame 2 is lowered toward the soil working position (FIG. 5).

The frame 2 is provided with the draft tongue 9 which is pivotally connected to the front end 10 of the frame. In the illustrated structure, pairs of ears 32 extend forwardly and downwardly from a transverse front beam 33 of the frame. The ears 32 have transversely aligned apertures therethrough to receive pivot pins 34 which also pass through bores formed through the rear end 35 of the side members 36 defining the tongue 9. The tongue side members 36 converge in the forward direction and are connected by means of a rear brace 37 and a front brace 38. The tongue 9 is provided at the front end 8 thereof with a pivoted hitch member or clevis 39 for hitching the frame 2 to a draw bar 40 of a tractor or draft vehicle 41.

The rocker arm 3 is pivotally connected to the frame 2 preferably at a position spaced somewhat above the level of the beams 17 and 18. The frame 2 is provided with a secondary framework 43 including a secondary transverse front beam 44 attached to the primary transverse front beam 33 at the middle of the beam 44 and extending generally the length of the front beam 33. In the illustrated frame 2, the cylinder end 28 of the ram 25 is connected to a tang 45 extending from the secondary front beam 44.

A pair of laterally spaced rocker arm supporting beams 48 extend between the secondary front beam 44 and the stub beam 49 extending between a centered pair of longitudinal beams 17. The beams 48 are channel shaped and taper toward the rear end thereof which are connected by a brace 50. The beams 48 support a pivot bracket 51 on which the rocker arm 3 is pivotally mounted.

The illustrated rocker arm assembly 3 is defined by a pair of laterally spaced rocker arm members 52 which act in unison. A pivot spacer sleeve 53 is positioned between the members 52, and a pivot pin 54 is received therethrough and through the members 52 and side walls of the bracket 51. At a first or lower end 55 of the rocker arm 3, a transverse spacer sleeve 56 attached to the end of the transfer link 4 is pivotally connected between the rocker arm members 52. Similarly, at a second or upper end 57 of the rocker arm 3, a transverse spacer sleeve 58 attached to the rear end 59 of the leveling link 7 is pivotally connected between the rocker arm members 52.

The transfer link 4 and leveling link 7 are preferably rigid members. The transfer link 4 may have any suitable cross section, such as the solid square cross section of the link 4 illustrated. The link 4 has a slot 60 formed at the rear end thereof to receive the lever arm 24 therein for pivotal attachment thereto. The link 4 may include reinforcement such as the gussets 61 between the front end of the link 4 and the sleeve 56. While the transfer link 4 is connected to the frame lifting lever 24 in the illustrated leveling arrangement 1, the link 4 could conceivably be connected to a separate lever extending from the rock shaft 20.

The illustrated leveling link 7 is a square tubular cross section member. The link 7 is preferably adjustable in length such that an implement frame 2 employing the leveling arrangement 1 may be leveled for use with tractors 41 having draw bars 40 at differing heights. The link 7 may be adapted for length adjustment in any suitable manner. The link 7 shown has a trunnion or sleeve 63 at the forward end thereof which is pivotally received between a pair of ears 64 mounted on the forward brace 38 of the tongue 9. A threaded stud 65 extends rearwardly and upwardly from the sleeve 63 and is recieved through an abutment block 66 attached to the end of the tubular portion of the link 7. As shown in FIG. 2, the position of the stud 65 relative to the block 66 is adjustably fired by means of a compression nut 67 and a tension nut 68 threaded onto the stud 65 on either side of the block 66. The compression nut 67 resists forces which tend to compress the length of the link 7; and, conversely, the tension nut 68 resists forces which tend to lengthen the link 7. The abutment block 66 may be attached to the tubular portion of the link 7 as by side plates 69 welded therebetween.

In operation, the leveling arrangement 1 maintains a substantially constant pitch, or fore and aft tilt, of the frame 2 as the frame is lifted toward the transport position (FIG. 4) or lowered toward the soil working position (FIG. 5). When it is desired to lower the frame 2 from the transport position to the soil working position, the hydraulic cylinder 25 is retracted to rotate the rockshaft 20 in a clockwise direction (as viewed in FIGS. 4 and 5) whereby the wheels 23 are raised thus allowing the frame 2 to lower toward the ground. As the rockshaft 20 rotates to lower the frame 2, the motion is transferred through the lever arm 24 and transfer link 4 to the rocker arm 3 whereby the lower arm 55 of the arm 3 is moved forwardly and the upper end 57 is moved toward the rear. The backward motion of the upper end 57 is transferred through the leveling link 7 to the tongue 9, tending to rotate the tongue 9 in a counterclockwise direction about the pivot pins 34 thereof. However, since the front end 8 of the tongue is substantially stationary because of its connection to the drawbar 40 of the tractor 41, the tongue 9 is rotated about the pivotal connection 71 of the hitch 39 of the tongue thereby lowering the front end 10 of the frame 2. By proper location of the connection between the transfer link 4 and lever arm 24, of the position of the pivot of the rocker arm 3, and the position of the connection of the link 7 to the tongue 9, the lowering of the front end 10 can be coordinated with the lowering of the frame 2 such that the frame remains level throughout the change in height. In a similar but opposite manner, the front end 10 of the frame 2 is raised as the frame is lifted toward the transport position.

The frame 2 may be adjusted to a level orientation by lengthening the leveling link 7 to tilt the frame backward or shortening the link 7 to tilt the frame forward. This adjustment might be necessary upon the hitching the frame 2 to a tractor 41 for the first time or if the frame is hitched to another tractor having a draw bar 40 at a different height. Further, if the size of the tires 23 is changed, a leveling adjustment would be necessary. The leveling ajustment is most conveniently made with the frame 2 hitched to the tractor 41 and in the transport position. To lengthen the link 7, the tension nut 68 is rotated to move in the rearward direction until the frame 2 is level. Then the compression nut 67 is tightened up to the stop block 66. To shorten the length 7, the compression nut 67 is screwed toward the forward direction until the frame is level, and the tension nut 68 is rotated to move the block 66 up against the compression nut 67. Alternatively, the nut 67 and 68 could be replaced with a single threaded nut which is rotatably fixed within the block 66. The location of the frame leveling adjustment members at a front end 8 of the tongue 9 provides for safe and convenient adjustment of the pitch of the frame 2.

The frame 2 is preferably provided with a depth limiting means to limit the lowering of the frame toward the soil working position. The depth limiting means could consist of a mechanical stop engageable by a member of the frame lift assembly 5 at the lowest desired position of the frame. As illustrated in FIGS. 2 and 3, the hydraulic cylinder 25 is provided with a hydraulic depth limiting means including a depth limiting valve 74 operated by a plunger 75 positioned for engagement by a tab 76 located on the piston rod 77 of the cylinder 25. The tab 76 is positionable along the rod 77 for selectively limiting the downward excursion of the frame 2. The valve 74 is in fluid communication with the hydraulic hoses 78 which supply fluid to and return fluid from the cylinder 25. Upon engagement of the tab 76 with the plunger 75, the valve 74 closes off one of the hoses 78 to prevent further retraction of the cylinder 25. The valve 74 is adapted to release in response to the pressure of fluid in the extension direction of the cylinder 25. The frame 2 may also be provided with a transport position stop (not shown) to mechanically hold the frame in the transport position without the use of the hydraulic cylinder 25, as for parking or storage of the frame 2.

FIG. 6 illustrates a modified embodiment of the leveling arrangement according to the present invention. The modified leveling arrangement 82 is particularly adapted for use on relatively wide implement frames 83, such as frames having folding wing sections. The frame 83 includes a rockshaft 84 rotatably mounted thereon and having a pair of wheel arms 85 extending from the rockshaft with ground engaging wheels 86 rotatably mounted thereon. The frame 83 is lifted and lowered respectively between a transport position and a soil working position by a pair of laterally spaced hydraulic cylinders 87 pivotally connected between a front longitudinal beam 88 of the frame 83 and respective frame lifting levers 89 extending from the rockshaft 84. The frame 83 has a tongue 91 pivotally connected at the front end 92 of the frame. The tongue 91 is substantially similar to the tongue 9 of the frame 2 and has a hitch clevis 93 pivotally mounted at a front end 94 of the tongue for hitching the frame 83 to a tractor.

The modified leveling arrangement 82 includes a pair of laterally spaced rocker arms 97 pivotally mounted on the frame 83 near the front end 92 thereof. A transfer link 98 is pivotally connected between a lower end 99 of each rocker arm 97 and a respective frame leveling lever 100 extending from the rockshaft 84. A leveling link side member 101 is pivotally connected to an upper end 102 of each of the rocker arms 97 and extends forwardly therefrom. The members 101 converge in the forward direction and are rigidly connected at the front ends 103 thereof by a stop block 104. The block 104 is pivotally connected to the front end 94 of the tongue 91. In the illustrated structure, a threaded bolt or stud 106 extends from a sleeve 107 which is rotatably positioned on a pivot pin 108 extending between a pair of ears 109 projecting from a brace 110 connecting the side members 111 of the tongue 91. The bolt 106 is received through the stop block 104 and is movably secured thereto by a compression nut 112 and a tension nut 113.

The modified leveling arrangement 82 is substantially similar to the preferred leveling arrangement 1 in structural details and in operation. The modified arrangement 82 is operative to raise the front end 92 of the frame 83 upon lifting of the frame toward the transport position and is operative to lower the front end 92 of the frame upon the lowering of the frame toward the soil working position to thereby maintain a substantially constant pitch of the frame 83. The double provision of the transfer links 98, rocker arms 97, and leveling links 101 results in less stress per individual member of the arrangement 82 and in more efficient distribution of the forces developed during leveling of the frame 82 than would be possible with the arrangement 1. The arrangement 82 is thus better adapted for relatively wide and heavy implement frames 83 than the arrangement 1. The pitch of the frame 83 may be corrected by adjusting the compression and tension nuts 112 and 113 in substantially the same manner as described for the preferred leveling arrangement 1.

It is to be understood that while certain forms of the present invention have been illustrated and described herein, it is not to be limited to the specific forms or arrangement of parts described and shown.

What is claimed and desired to be secured by Letters Patent is:

1. A self-leveling arrangement for use on an agricultural implement supporting frame including ground engaging means, frame lift means operatively connected between said frame and said ground engaging means and operable to raise said frame to a transport position and to lower said frame to a soil working position, and a draft tongue pivotally connected to a frame front end of said frame and having a hitch member on a tongue front end of said tongue for connecting said frame to a draft vehicle, said self-leveling arrangement comprising:
   (a) a rocker arm pivotally mounted on said frame and having a first end and an opposite second end;
   (b) a transfer link pivotally connected between said first end of said rocker arm and said frame lift means;
   (c) a leveling link pivotally connected between said second end of said rocker arm and said tongue front end whereby upon raising said frame toward said transport position said frame front end is raised and upon lowering said frame toward said soil working position said frame front end is lowered to thereby maintain a substantially constant pitch of said frame;

(d) said rocker arm, said transfer link, and said leveling link respectively being a first rocker arm, a first transfer link, and a first leveling link;

(e) a second rocker arm substantially similar to said first rocker arm being pivotally mounted on said frame in laterally spaced relation to said first rocker arm, said second rocker arm having a first end and a second end;

(f) a second transfer link being pivotally connected between said first end of said second rocker arm and said frame lift means;

(g) a second leveling link being pivotally connected between said second end of said second rocker arm and said tongue front end; and (h) said first and second leveling links extending toward said tongue front end in forwardly converging relation.

2. An arrangement as set forth in claim 1 wherein:

(a) said frame lift means includes a laterally extending rockshaft rotatably mounted on said frame;

(b) a pair of frame leveling levers extend from said rockshaft; and (c) said first and second transfer links are pivotally connected respectively to said frame leveling levers.

3. An agricultural implement frame arrangement comprising:

(a) an agricultural implement frame for supporting tillage tools, said frame having a frame front end;

(b) ground engaging means operatively mounted on said frame;

(c) frame lift means connected between said frame and said ground engaging means and operable to raise and lower said frame respectively between a raised transport position and a lowered soil working position;

(d) a draft tongue pivotally connected to said frame front end and having a tongue front end, said tongue front end having a hitch member thereon for connection of said frame to a draft vehicle;

(e) a rocker arm pivotally mounted on said frame and having a first end and an opposite second end;

(f) a transfer link pivotally connected between said first end of said rocker arm and said frame lift means;

(g) a leveling link pivotally connected between said second end of said rocker arm and said tongue front end whereby upon raising said frame toward said transport position said frame front end is raised and upon lowering said frame toward said soil working position said frame front end is lowered to thereby maintain a substantially constant pitch of said frame;

(h) said rocker arm, said transfer link, and said leveling link being respectively a first rocker arm, a first transfer link, and a first leveling link;

(i) a second rocker arm substantially similar to said first rocker arm being pivotally mounted on said frame in laterally spaced relation to said first rocker arm, said second rocker arm having a first end and a second end;

(j) a second transfer link being pivotally connected between said first end of said second rocker arm and said frame lift means;

(k) a second leveling link being pivotally connected between said second end of said second rocker arm and said tongue front end; and (l) said first and second leveling links extending toward said tongue front end in laterally converging relation.

* * * * *